United States Patent [19]
Yoshie et al.

[11] Patent Number: 5,586,210
[45] Date of Patent: Dec. 17, 1996

[54] APPARATUS FOR CONNECTING METAL TUBES COVERING OPTICAL FIBER CABLES AND METHOD OF JOINING OR SPLICING TWO OPTICAL FIBER CABLES

[75] Inventors: Yasunori Yoshie; Saburou Ishiro, both of Kawasaki; Ryosuke Hata; Takeshi Nakamura, both of Osaka, all of Japan

[73] Assignees: NKK Corporation, Tokyo; Sumitomo Electric Industries, Inc., Osaka, both of Japan

[21] Appl. No.: 519,480

[22] Filed: Aug. 25, 1995

[30] Foreign Application Priority Data

Aug. 26, 1994 [JP] Japan ................................ 6-224029

[51] Int. Cl.⁶ .............................. G02B 6/00; G02B 6/36
[52] U.S. Cl. ............................................................ 385/96
[58] Field of Search ................. 385/95–97; 219/121.63, 219/121.64, 121.85

[56] References Cited

U.S. PATENT DOCUMENTS

| | | | |
|---|---|---|---|
| 4,220,394 | 9/1980 | Tardy | 385/96 |
| 4,911,524 | 3/1990 | Itoh et al. | 385/97 |
| 5,218,184 | 6/1993 | Hakoun et al. | 385/97 |
| 5,249,247 | 9/1993 | Whitesmith | 385/97 X |
| 5,315,682 | 5/1994 | Daguet et al. | 385/95 |
| 5,422,456 | 6/1995 | Dahm | 219/121.6 |

FOREIGN PATENT DOCUMENTS

| | | | |
|---|---|---|---|
| 0272207 | 11/1987 | Japan | 385/97 |
| 0254905 | 10/1989 | Japan | 385/97 |

*Primary Examiner*—Akm E. Ullah
*Attorney, Agent, or Firm*—Frishauf, Holtz, Goodman, Langer & Chick

[57] ABSTRACT

An apparatus for connecting metal tubes covering optical fiber cables includes at least two clamp units 10, 10' for holding a metal sleeve (C5) and two metal tubes (C2, C2') covering two optical fiber cables (C, C') in close position. A laser welding head is placed between two adjacent clamp units. Each clamp unit has a gear (22) as a rotation body to be driven by a drive gear, a clamp device (28, 33, 34) for clamping the metal tube covered optical fiber cables which are introduced in inserting holes (31) where the metal tube covered optical fiber cables are inserted. The clamp device is supported by the rotation body (22) so as to be movable together with the rotation body. The rotation body and the clamp device each are provided with a radially extending selectively open or blocked extraction path (36, 22') to remove, in a radial direction, the metal tube optical fiber cable which has been connected by the apparatus.

16 Claims, 5 Drawing Sheets

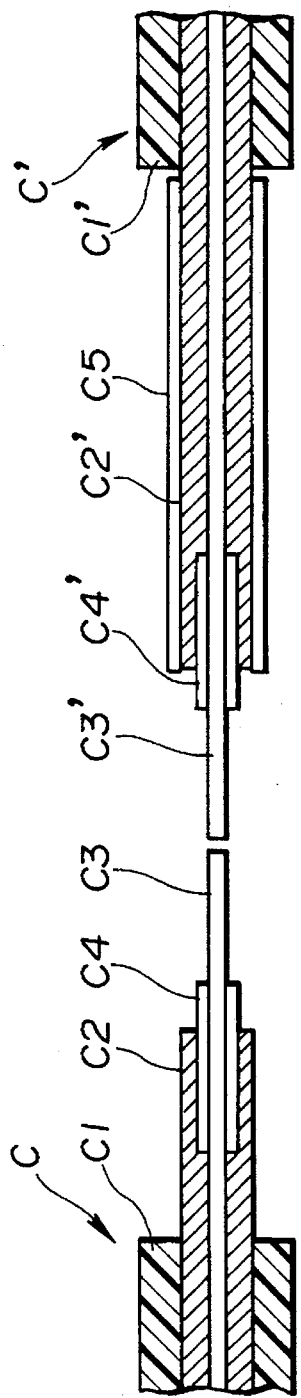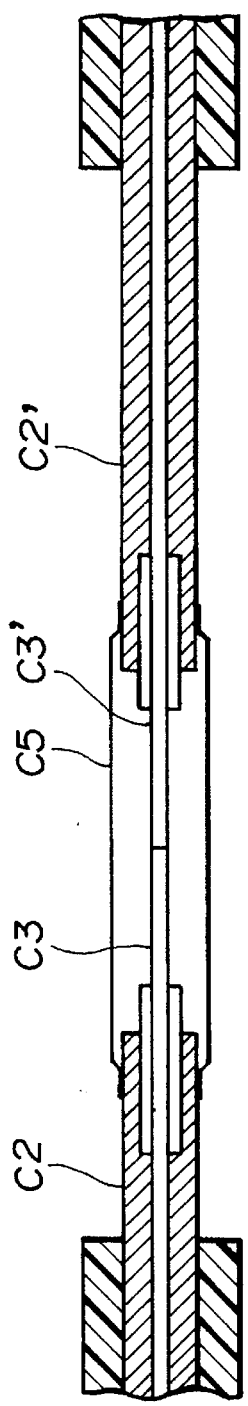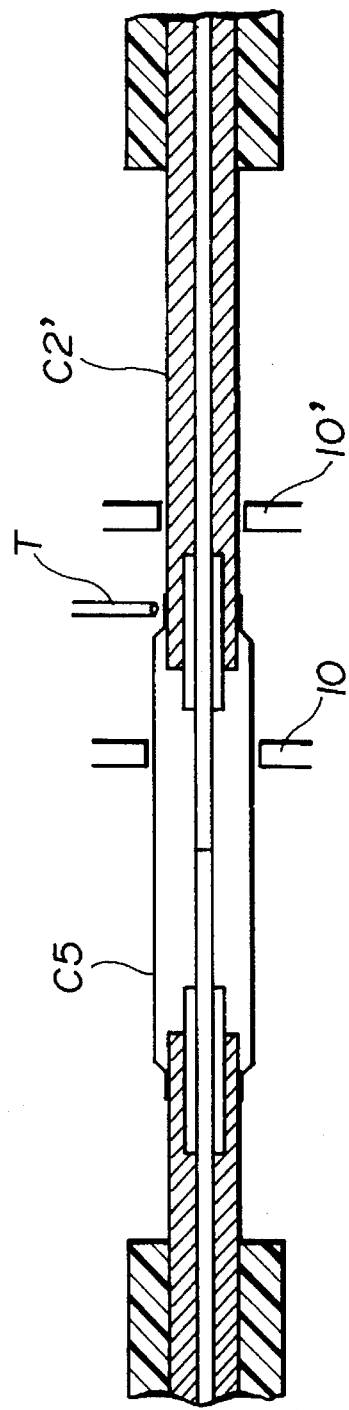

5,586,210

APPARATUS FOR CONNECTING METAL TUBES COVERING OPTICAL FIBER CABLES AND METHOD OF JOINING OR SPLICING TWO OPTICAL FIBER CABLES

BACKGROUND OF THE INVENTION

1. Field of the Invention

The present invention relates to an apparatus for splicing, or connecting metal tube-covered optical fiber cables, and more particularly to such cables of long lengths and supplied on reels, and which provides for rapid and efficient handling of the spliced cables.

2. Background

Optical fiber cables range generally from several hundred meters to tens of kilometers in length; they are wound on reels or the like. In the case where a distance to be covered with a metal tube covered optical fiber cable is longer than the mentioned lengths of available optical fiber cables, two metal tube covered optical fiber cables must be connected together when the entire metal tube covered optical fiber cable is laid.

As a method of connecting such metal tube covered optical fiber cables, core optical fiber cables are exposed, that is, protruded from metal tube clad, or covered parts of the two metal tube covered optical fiber cables to be connected at their respective ends. A metal sleeve is pushed over the end of one cable and beyond the end to be spliced; the ends of the exposed optical fiber cables are then connected by fusion to each other; the metal sleeve, with an outer diameter close to that of the metal tubes covering the optical fiber cables covers only one optical fiber cable side, is then slid to a position over the splices. The metal tubes for the two optical fiber cables and the sleeve are connected, and sealed if necessary. Thereafter, the metal sleeve and the metal tubes are welded on both sides. In this way, the metal sleeve is connected to the metal tubes on both sides, and the two optical fiber cables are connected.

When both ends of the metal sleeve are welded to the metal tubes on both sides, their positions must be fixed and the metal sleeve and metal tubes must be respectively held. A welding head is rotated once peripherally to complete the weld.

Various methods of welding are generally known. However, since the metal tube is very small in diameter and thin in thickness, highly accurate welding is required and for this reason, laser beam welding is preferably utilized.

In the case of general welding other than laser welding, the metal tubes and metal sleeve are static without being rotatable, and a welding head, e.g., a welding torch makes one rotation around the periphery thereof. When the laser beam is used, accurate rotation of the head is difficult and an extremely complex mechanism is needed if the head is to be rotated accurately. Therefore, an apparatus has been employed by which the head is static, the metal tubes and the metal sleeve are accurately supported and the metal tubes and the metal sleeve are rotated at a constant speed.

After the weld is made, it is necessary to wind the optical fiber cable from a reel of the optical fiber cable through the splicing apparatus e.g., to another reel, in order to remove such connected optical fiber cable from the apparatus after the connection. This has greatly hampered work efficiency. In particular, this is a major problem when the optical fiber cable is long.

THE INVENTION

It is an object of the present invention is to provide an apparatus for connecting metal tubes covering optical fiber cables in which a metal tube covered optical fiber cable which is connected by fusion and then welded can easily be removed from the apparatus, thus improving the efficiency of the removal and the insertion thereof.

Briefly, the apparatus for connecting metal tubes covering optical fiber cables, includes at least two clamp units for holding a metal sleeve and two metal tubes, each metal tube covering an optical fiber cable, in a close relation at respective positions where ends of the two optical fiber cables are exposed from the two metal tubes and connected by fusion. The metal sleeve bridges adjacent ends of the two metal tubes. Each clamp unit includes a rotation body which can be driven, with two supports sandwiching the rotation body therebetween such that the rotation body is rotatably supported therein; drive means are provided for rotationally driving the rotation body. The rotation body and the two supports each have an axial inserting hole where the two optical fiber cables are positioned along a center axis of the rotation body. The rotation body and two supports each further have an element insertion hole for inserting and placing an inner rotation body element along the center axis of the rotation body. Clamp means are provided acting on the cable in the axial hole of the rotation body, for clamping one end of each of the two optical fiber cables inserted therein.

In accordance with a feature of the invention, the clamp means and the rotation body each have a radial extraction path, e.g., formed by a radially extending slot or a groove, through which the metal tube covered optical fiber cable, spliced and connected into a single optical fiber cable can be removed in a radial direction from the rotation body. Preferably, the rotation body is accurately guided.

Metal welding means can then be placed between the two clamp units, for welding the metal sleeve to respective ends of the two metal tubes, while the spliced cable is being rotated.

The clamp units of the apparatus of the present invention are mounted on a base and are movable in parallel with a center axis of the rotation body.

The cable extraction path preferably comprises a guide groove in the clamp means extending in a slot form in a radial direction, and an extraction groove formed in the rotation body extending from an inner diameter surface to an outer peripheral surface of the rotation body in the radial direction and in communication with the guide groove. The rotation body includes a packing member selectively detachably engageable within the extraction groove to close the extraction groove or to permit removal of the cable therethrough.

The rotation body further may include a gear; the drive means is engaged with the gear of the rotation body and comprises a drive gear, supported by the two supports and having a hollow shaft hole, a spline shaft engaged with the hollow shaft hole of the drive gear, and spline shaft drive means for rotationally driving the spline shaft. The spline shaft permits axial displacement of the driven element.

DRAWINGS

FIG. 3A, FIG. 3B and FIG. 3C show, in highly schematic representation different steps of connection of the metal tube covered optical fiber cables using the apparatus of the present invention;

DETAILED DESCRIPTION

Figure 1:
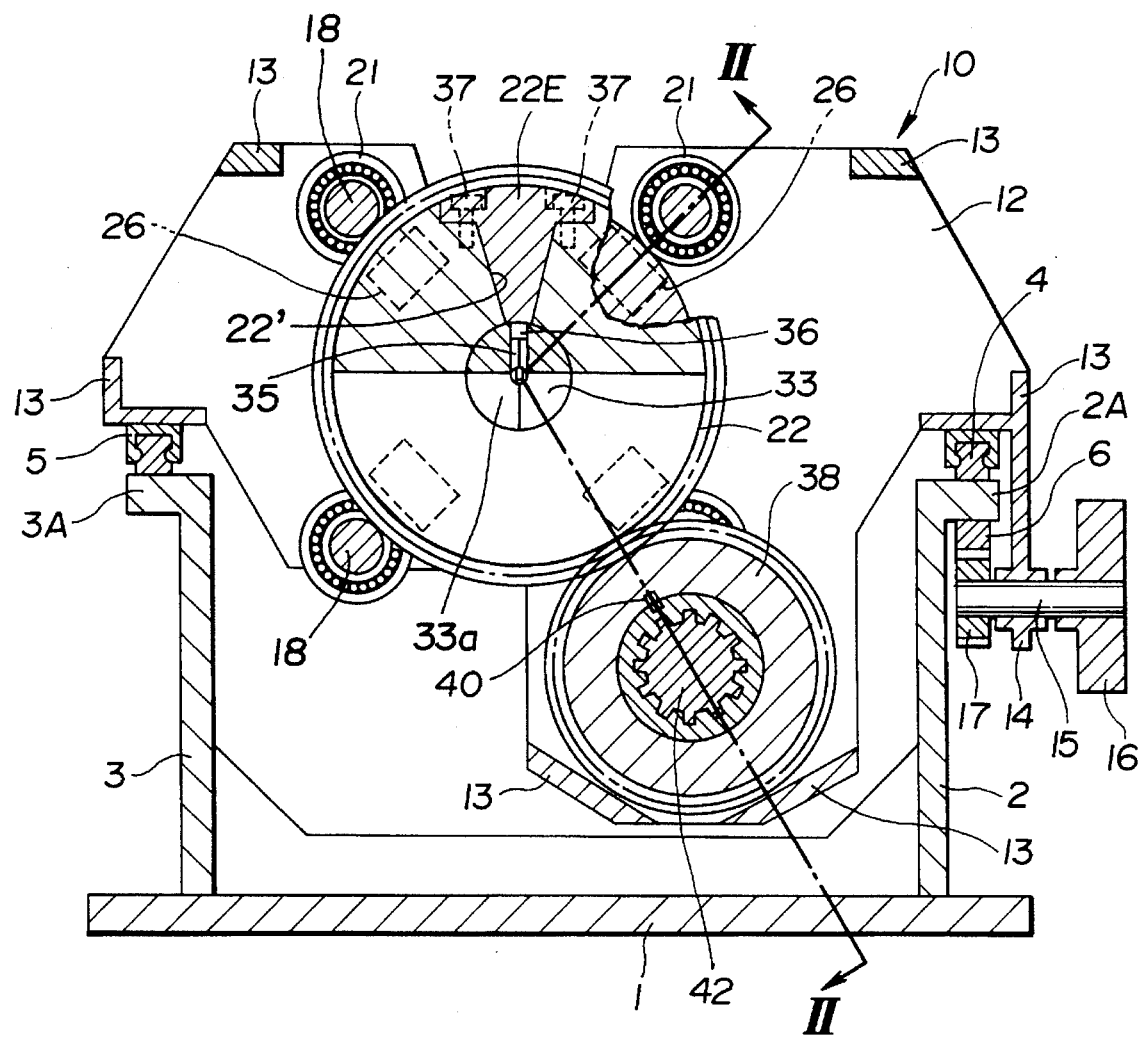
FIG. 1 is a sectional view of an embodiment of the present invention taken perpendicular to a plane having a horizontal axis of the apparatus along line I—I of FIG. 2.

FIG. 1 shows a base 1 for an apparatus of the present invention, having side walls 2 and 3 extending perpendicular to the horizontal axis of the apparatus. The top parts of both side walls 2 and 3 are formed in a reversed L shape and provided with seat parts 2A and 3A.

On upper surfaces of the seal parts 2A and 3A, rails 4 and 5 are placed extending in a direction parallel to the horizontal axis of the apparatus. On a lower surface of one seat part 2A, a rack 6 is provided parallel with rail 4.

At least two clamp units 10, 10' which can change their positions are located on base 1, guided by rails 4 and 5. The positions of the at least two clamp units 10, 10' are changeable independently of one another on rails 4 and 5 and they have the same structure. Therefore, only one clamp unit 10 will be described.

Clamp unit 10 has a frame which is formed by two supports 11 and 12, and a plurality of connecting members 13 for connecting supports 11 and 12 such that there is a spacing between supports 11 and 12. A flange part 14 is suspended from one connecting member 13 which is situated close to rail 4, a shaft 15 is rotatably supported on flange part 14, and a handle 16 is attached to one end of shaft 15. A pinion 17 is attached to the other end of shaft 15, with pinion 17 being engaged with rack 6. Thus, clamp unit 10 can move on rails 4 and 5 by rotating handle 16, whereby clamp units 10, 10' can change their positions, thus adjusting a spacing between two adjacent clamp units 10'.

A plurality (four in the drawing) of stepped shafts 18 which function as spacers for accurately maintaining a spacing between supports 11 and 12 are provided between supports 11 and 12 of each clamp unit 10. Nuts 19 are threadedly engaged on opposite ends of each shaft 18 extending through supports 11 and 12. A stepped part 18A and a spacer 20 are formed or located on each stepped shaft 18, and between stepped part 18A and spacer 20, a rotation supporter 21 such as a bearing or the like is arranged. A gear 22 forming a body of rotation, is positioned between rotation supporters 21 of the four stepped shafts and between supports 11 and 12, and is freely rotatably supported, as a rotation body to be driven, by the four rotation supporters 21. Gear 22 is provided with a cylindrical protrusion part 22B having outer gear teeth 22A, and is centrally rotatably supported by engagement of gear teeth 22A with the four rotation supporters 21 on an outer peripheral surface of the cylindrical protrusion part 22B.

The supports 11, 12 are formed with vertical hollow shaft-holes 11A and 12A. Pins 24 and 25 whose positions are fixed by a set screw 23 are inserted into hollow shaft-holes 11A and 12A, and rotatable supporters 26 and 27 such as bearings or the like are rotatably supported in window parts 11B and 12B formed in supports 11 and 12. Rotatable supporters 26 and 27 are brought into contact with opposite side surfaces of cylindrical protrusion part 22B of gear 22, accurately maintaining the position of gear 22 on its axis of rotation.

Element insertion holes 11C, 12C and 22C are respectively provided in support 11 and 12 and gear 22. The centers of holes 11C, 12C are coaxially arranged with respect to the axis of rotation of gear 22. Element insertion hole 22C of gear 22 has a stepped form so that the diameter of element insertion hole 22C on the opening side thereof is substantially the same as that of element insertion hole 12C of support 12, and the diameter of the other side of element insertion hole 22C is smaller than that of the opening side, so as to form the stepped configuration. A threaded portion 22D is formed inside element insertion hole 22C of gear 22.

An inner rotation body element 28 is located within the rotation body formed by gear 22. Element 28 is partly threaded and is inserted so as to be engaged with threaded portion 22D, penetrating through element insertion hole 12C of support 12. Thus, element 28 is inserted and placed coaxially in element insertion holes 12C, 22C, 22D, respectively. An outer peripheral surface 29 of the head part of rotation body element 28 is knurled for convenience in manually rotating the same. A set screw hole 30 is formed so as to allow tools to be used to effect the rotation.

Figure 2:
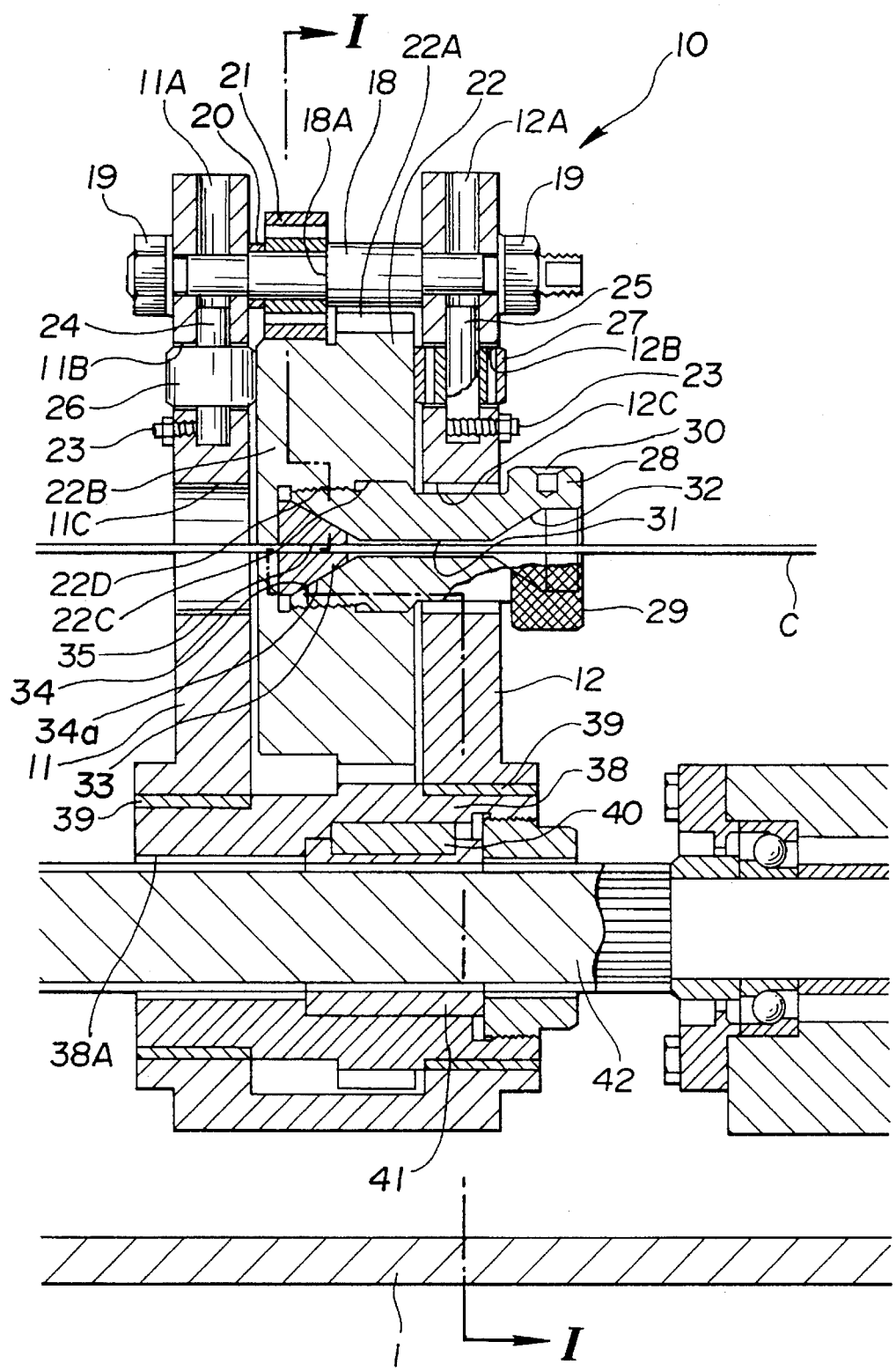
FIG. 2 is a sectional view taken along line II—II of FIG. 1.

Rotation body element 28 is provided with a guide hole 31 penetrated therein for running a metal tube covered optical fiber cable along a center axis of rotation body element 28. Guide hole 31 has an introduction portion 32, on the right side thereof as viewed in FIG. 2, formed by a tapered opening so as to facilitate introduction of the optical fiber cable. Rotation body element 28 includes a housing part 34, on the left side thereof as viewed in FIG. 2, formed with a tapered hole 34a so as to house a holding member 33. Body element 28, including housing part 34 is radially split, or formed with a radial groove extending to the control guide hole 31.

Holding member 33 has a conical outer face matching, and aligned with the conical inner face of housing part 34. An axially extending clamp hole 35 is formed in a center position for holding optical fiber cables. Holding member 33 may be divided into plural parts along a plane which includes the center axis. Clamp hole 35 is combined with guide hole 31 to integratedly form an inserting hole on the center axis of the rotation body, through which the respective metal tube covered fiber cables to be connected are inserted and positioned. For example, in FIG. 1, holding member 33 may be divided into a left part and a right part as schematically shown by line 33a. The diameter of clamp hole 35 is slightly smaller than that of the metal tube C2, C2' (FIG. 3) covering the optical fiber cable C, C1 in the case of a clamp unit for holding a metal tube covered optical fiber cable, while the diameter of clamp hole 35 is slightly smaller than that of the metal sleeve C5 in the case of a clamp unit for holding the metal sleeve.

When rotation body element 28 is rotated relative to gear 22, the threads on portion 22D cause the optical fiber cable to be clamped and firmly held in clamp hole 35 by pressure between the tapered faces of holding member 33 and housing part 34 of body 28. Thus, a clamp means is formed by rotation body element 28 and holding member 33.

When rotation body element 28 is loosened and rotated in a direction away from holding member 33, a space having a dimension greater than the diameter of a metal tube covered optical fiber cable is formed between the two divided parts of holding member 33.

As shown in FIG. 1, a guide groove 36 communicating with guide hole 31 and opening upwardly is formed in rotation body element 28. Further, gear 22 as a body of rotation, is divided with part thereof notched at 22'. Specifically, in FIG. 1, gear 22 is divided with a portion of its upper part 22E in a roughly V-shape, freely detachably (from notch 22') connected to gear 22 by bolts 37.

Thus, when rotation body element 28 is loosened, and part 22E of gear 22 is detached, a large gap between divided holding member 33 and guide groove 36 of rotation body element 28 forms an extraction path (22') through which the metal tube covered optical cable can be extracted in a radial direction with respect to gear 22.

A drive gear 38 as a drive means for driving the rotation body of gear 22 is engaged with the teeth of gear 22. Drive gear 38 is freely rotatably supported by supports 11 and 12 through opposite by located bearings 39. A hollow shaft-hole 38A is formed in drive gear 38, with a large diameter portion thereof being provided in the axial direction thereof and a spline inner gear 41 being fixed thereto by a key 40. Spline inner gear 41 is engaged with a spline shaft 42. Rotary drive force from spline shaft 42 is transmitted to drive gear 38. The clamp unit 10 can still move in the axial direction.

Connecting metal clad optical fiber cables, with reference to FIGS. 3A–3C

Each of the metal tube covered optical fiber cables is protected with an insulated outer sheath C1, C1' respectively. The figures are highly schematic and not to scale.

Step 1: Before metal tube covered optical fiber cables C and C' protected with insulated outer sheaths C1 and C1'; (see FIG. 3A) are put in the apparatus of the present invention so as to connect the metal tube covered optical fiber cables C and C', each of the insulated outer sheaths C1 and C1', is removed to a predetermined length, to expose each of the metal tubes C2 and C2' covering core optical fiber cables C3 and C3', respectively. Each metal tube C2 and C2' is removed to a predetermined length to expose each optical fiber cable C3 and C3', respectively.

Step 2: In each of the respective metal tube covered optical fiber cables C and C', a protecting metal tube C4, C4' (FIG. 3A) is inserted between the optical fiber C3 and metal tube C2. The length and inserting depth of protecting metal tube C4 are selected so as to prevent the effect of welding on optical fiber cable C3.

Step 3: A metal sleeve C5 (FIG. 3A) is fitted over metal tube C2' of one optical fiber cable C'. In this state, the ends of optical fibers C3 and C3' of the two optical fiber cables C and C' are connectable by fusion to each other.

Step 4: As shown in FIG. 3B, metal sleeve C5 is moved toward the other optical fiber cable C, positioned over metal tubes C2 and C2' of both metal tube covered optical fiber cables C and C and coupled with metal tubes C2 an C2', e.g. by deformation of the end portions of sleeve C5.

Step 5: The metal tube covered optical fiber cables in a state of preliminary connection can then be placed in the clamp units 10, 10'. During this connection process, as to the two metal tube covered optical fiber cables C and C', the optical fiber cables C3 and C3', already connected by fusion, and the metal tubes C2 and C2' are temporarily connected by metal sleeve C5 in a state of a string of a single metal tube covered optical fiber cable.

As shown in FIG. 1, part 22E of gear 22 is removed, rotation body element 28 is loosened and, with a spacious gap formed between divided holding member 33, optical fiber cable C3 is guided from an outside in a radial direction into guide hole 31 of rotation body element 28 and to clamp hole 35 of holding member 33 through guide groove 36. The positional relationship between optical fiber cables C3 and C3' and the two respective clamp units 10 and 10' with regard to the axial direction must be set so that for one optical fiber cable, one clamp unit 10 is positioned on metal sleeve C5 and the other clamp unit 10' is positioned on metal tube C2'. Both clamp units 10 and 10' are positioned where metal tube C2' and metal sleeve C5, respectively are to be welded, that is, the connecting position of metal sleeve C5 between the two clamp units. A laser welding head T is provided facing the part to be welded at the connecting position of metal sleeve C5 to form a connected part.

Step 6: In the two clamp units 10 and 10', after part 22E of gear 22 is reattached to gear 22, rotation body element 28 is rotated, holding member 33 is tightened and metal sleeve C5 and metal tube C2' are firmly fixed in position.

Step 7: At the connecting position, welding of one end of each metal sleeve C5 and metal tube C2' is started by welding head T. Gear 22, engaged with drive gear 38, is rotated by drive gear 38 at a predetermined speed. Therefore, the metal tube covered optical fiber cables C, C' are rotated at the same speed and welding is performed on the entire periphery thereof.

Step 8: After welding is completed, the rotation body element 28 is loosened and a spacious gap is formed between the divided holding members 33. A spacious gap is also simultaneously formed by removing the part 22E of the gear 22, and then, the connected metal tube covered optical fiber cable, after welding, is removed to the outside of the radial direction through the spacious gap and through the groove 36 of the rotation body element 28.

Step 9: Then, subsequently, the positional relationship between the two clamp units 10 and 10' and optical fiber cables C3 and C3' with regard to the axial direction is restored to that, for welding the connection part at the other end of the metal sleeve C5; the welding is carried out in accordance with the steps 5 to 8 mentioned above to finish the process.

It is not always necessary to follow the steps 1 to 9, and thus, some changes are possible. For example, the operations in steps 1 to 4 may be performed in a state where the optical fiber cable is brought to the embodiment of the present invention. In this case, if the optical fibers of the two optical fiber cables are in a state prior to welding, as shown in FIG. 3A, the respective optical fiber cables may be inserted not in the radial direction but in the axial direction, that is, from introducing part 32 of rotation body element 28. Further, in the above explanation of the steps, the two clamp units 10, 10' are prepared and with respect to the two optical fiber cables C3, C3' to be connected, one end of metal sleeve C5 is first welded and then the clamp unit 10 or the optical fiber cable is moved so as to weld the other end of metal sleeve C5. Also, by providing four clamp units, welding at both ends of metal sleeve C5 can be carried out simultaneously.

The application of the present invention is not limited to the embodiment shown in the drawings, and various modifications can be made thereto.

For example, the rotation body is not limited to a gear, and a friction wheel may be used instead. Although pressure with the friction wheel for driving must always be kept in order to obtain sufficient frictional force, its construction is simplified and thus little noise is generated.

Further, a part of the rotation body is not necessarily required to be removed so as to form an extraction path communicating with the guide groove 36 of the clamp means. For example, a slit-formed extraction groove extending in a radial direction to the outer peripheral surface may be used. In this case, if the rotating body is a gear, it is preferable to use a helical gear having teeth obliquely crossing the extraction groove so as not to form discontinuous points on the outer peripheral teeth.

Figure 4:
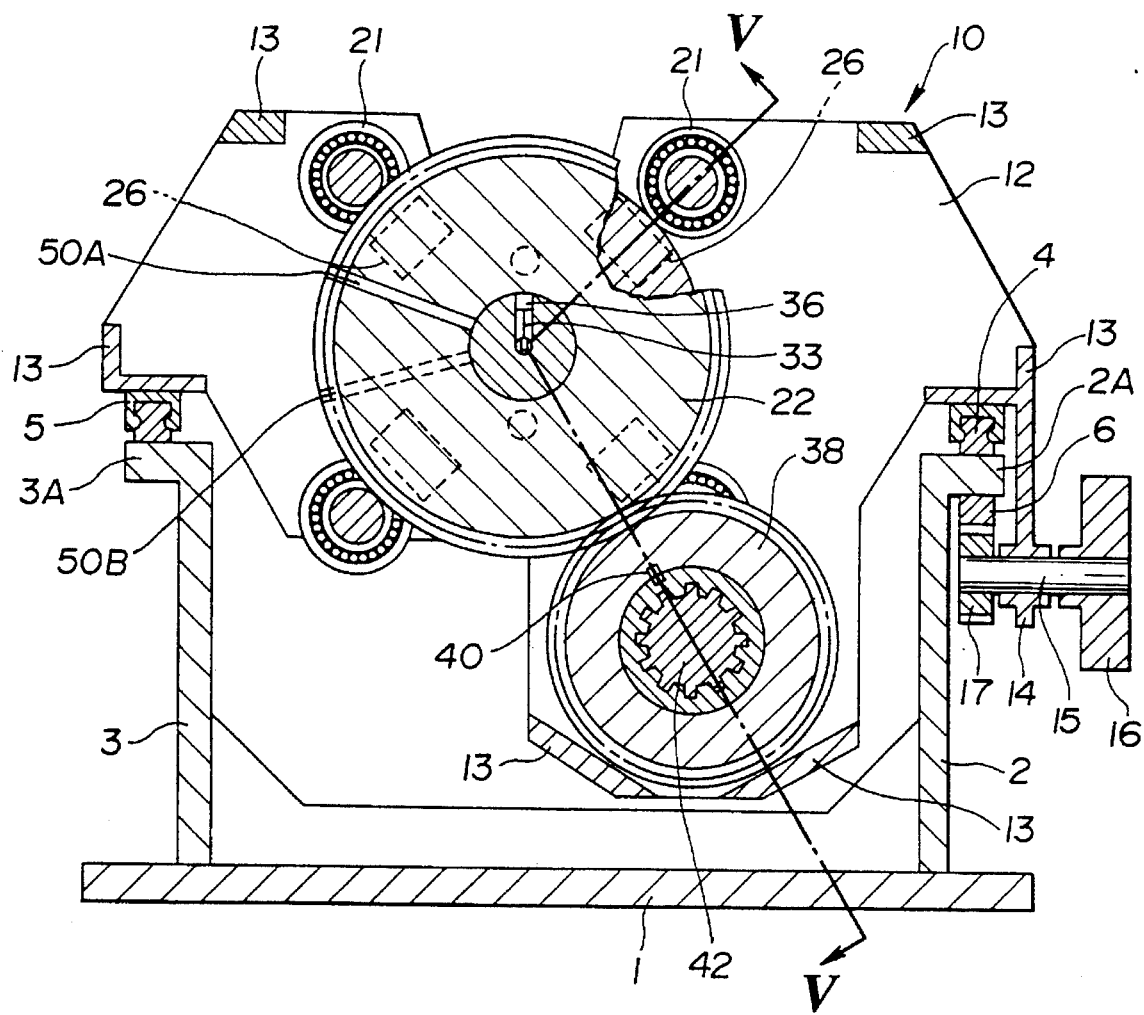
FIG. 4 is a sectional view of another embodiment of the present invention.
Figure 5:
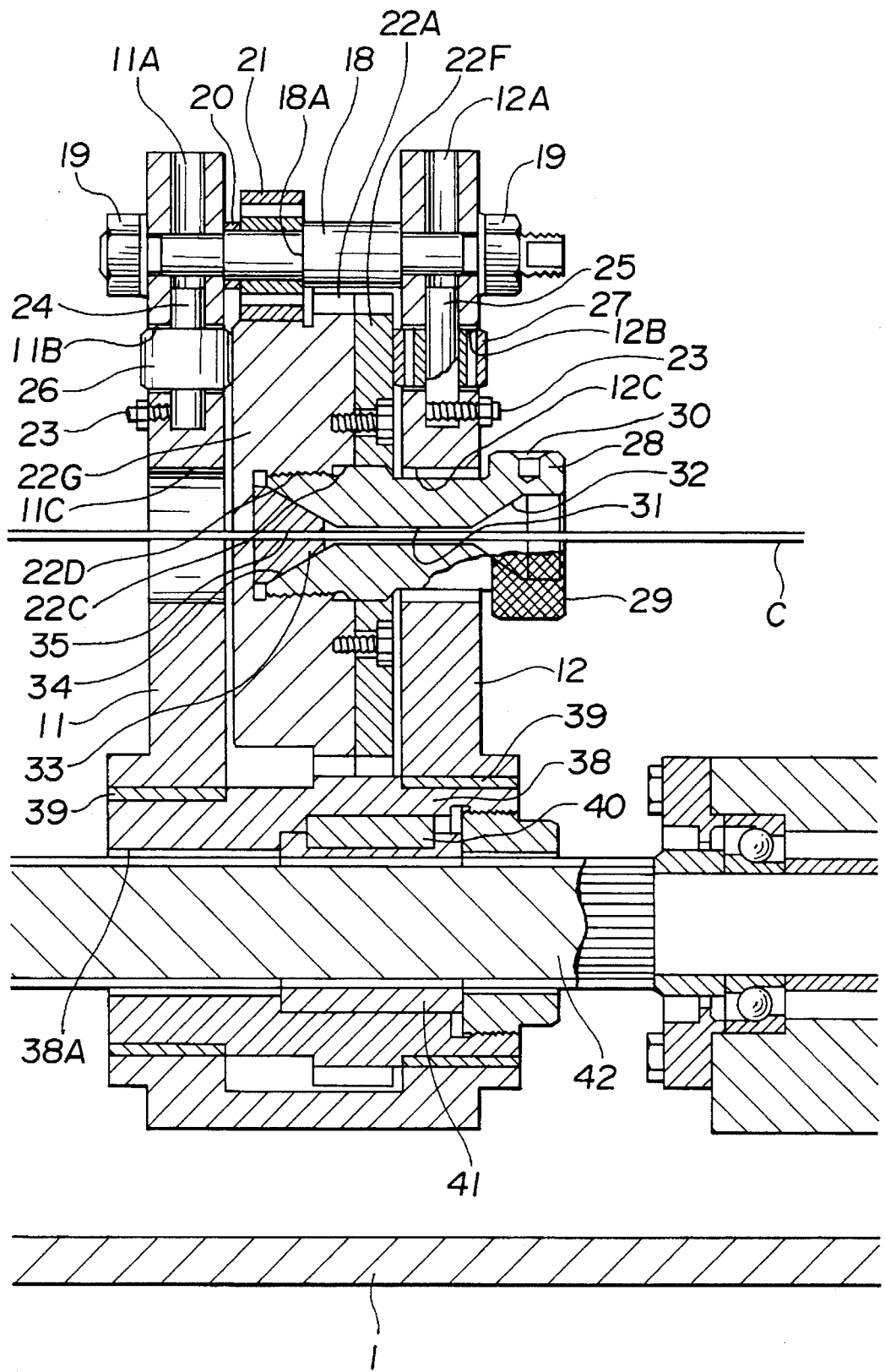
FIG. 5 is a section view taken along line V—V of FIG. 4.

Still further, the rotation body in the above described embodiment comprises one gear. However, the rotation body can be divided into two rotation bodies 22F, 22G as shown in FIG. 4 and FIG. 5, extending side by side in an axial direction and suitably connected by screws (FIG. 5). In this case, in the divided rotation bodies, slit-shaped extraction grooves 50A, 50B are respectively formed in rotation bodies 22F, 22G at positions shifted in the peripheral direction and must be brought to a coincident position by an operation performed when removing a metal tube covered optical fiber cable. In this way, even when the slit-shaped extraction grooves of the divided rotation bodies are formed so as to reach a position close to the supported metal tube covered optical fiber cable, the metal tube covered optical fiber cable does not enter into the extraction grooves and vibrate.

It is also possible to position the extraction grooves of the two divided rotation bodies at shifted positions, and providing an elastic body which operates in a peripheral or rotational direction between the two divided rotation bodies. By adding an external force when extracting a cable, bodies 22F, 22G can be moved against the force of the elastic body to a position at which the slit-shaped extraction grooves are coincident.

According to the present invention, as described above, the metal tube covered optical fiber cable can be removed from the apparatus in a radial direction immediately after being welded without winding the metal tube covered optical fiber cables, connected by means of welding, in a longitudinal direction to remove them from the apparatus. Thus, subsequent metal tube covered optical fiber cables can be connected one after another, thereby improving operation efficiency. In particular, if long metal tube covered optical fiber cables are used, this effect in commercial practice is remarkably increased.

Various change in modifications may be made and any features described herein in connection with any one of the embodiments may be used with any of the others, within the scope of the inventive concept.

What is claimed is:

1. An apparatus for connecting metal tubes covering optical fiber cables, characterized by:

at least two clamp units (10, 10') for holding a metal sleeve (C5) and a metal tube (C2, C2'), said metal tube covering an optical fiber cable, in a close relation at respective positions where ends of two optical fiber cables are exposed from respective metal tubes and connected by fusion, and where the metal sleeve bridges adjacent ends of the respective metal tubes, each said clamp unit including:

a rotatably driveable rotation body (22), two supports (11, 12) sandwiching said rotation body therebetween such that said rotation body is rotatably supported therein, drive means (38, 40, 41, 42) for rotationally driving the rotation body (22), the rotation body (22) and said two supports (11, 12) each having an element insertion hole for admitting an inner rotation body element (28) along the center axis of said rotation body, which inner rotation body element (28) has an inner axial inserting hole for one of the optical fiber cables along a center axis of said rotation body, clamp means (28, 33, 34) placed in the insertion hole of said rotation body, for clamping one end of the respective optical fiber cable or the sleeve (C5), said clamp means and said rotation body each having a radially extending extraction path (36, 22') through which a metal tube covered optical fiber cable connected into a single optical fiber cable can be removed in a radial direction of said rotation body; and metal welding means (T) placed between the two clamp units, for welding said metal sleeve to respective ends of said two metal tubes.

2. The apparatus of claim 1, including a base (1) movably mounting said clamp units for movement in parallel with a center axis of said rotation body.

3. The apparatus of claim 1, characterized in that:

said extraction path comprises:

a guide groove (36) extending in a slit form in the clamp means (28, 33, 34) in a radial direction, and an extraction groove (22') formed from an inner diameter surface to an outer peripheral surface of the rotation body (33) in said radial direction and in communication with said guide groove, and said rotation body includes a packing member (22E) detachably engageable within the extraction path to close said extraction groove.

4. The apparatus of claim 1, characterized in that:

said rotation body includes a gear (22), said drive means is engaged with said gear of the rotation body and comprises:

a drive gear (38) supported by the two supports and having a hollow-shaft hole (38A), a spline shaft (42) engaged with said hollow-shaft hole of the drive gear, and spline shaft drive means for rotationally driving the spline shaft.

5. The apparatus of claim 1, characterized by further comprising:

a plurality of first rotation supporters (21) for rotatably supporting a periphery of said rotation body, a plurality of second rotation supporters (26, 27) in contact with sides of said rotation body (22) for further rotatably supporting said rotation body, the second rotation supporters being rotatably attached to the two supports; and a plurality of shafts (18) for supporting the first rotation supporters, the shafts bridging the two supports.

6. The apparatus of claim 1, characterized in that:

the rotation body element is threadedly engaged with the threaded guide hole (31) of said rotation body, said rotation body element including an end part (34) and a tapered opening (34a) expanding toward said end part, and a holding member (33) located on the center axis of said rotation body placed under pressure in said tapered opening, said holding member being divided into a plurality of parts and having the inserting hole into which the respective optical fiber cable or the metal sleeve (C5) is inserted, the inserting hole being gradually contracted upon threadedly turning the rotation body element with respect to said rotation body in one direction so as to clamp the optical fiber cables and being expanded upon threadedly turning the rotation body element in an opposite direction whereby the optical fiber cables are released from clamping.

7. The apparatus of claim 3, wherein said extraction groove of said rotation body is formed along a surface plane including the center axis of said rotation body.

8. The apparatus of claim 7, wherein said rotation body is a helical gear.

9. The apparatus of claim 7, wherein said rotation body comprises first and second divided rotation bodies (22F, 22G), said first and second divided rotation bodies being divided along a plane perpendicular to the center axis, at least one divided rotation body being rotatably adjustable relative to the other divided rotation body; and wherein the extraction path is slit-shaped and formed in each divided rotation body, with said slit-shaped extraction paths being made coincident with each other by position adjustment of said divided rotation bodies relative to each other.

10. A method of joining or splicing two optical cables (C, C') having cable ends, in which said cables have metal tubes or cladding (C2, C2'), the optical fibers of said cable ends being fused and preliminarily connected with a metal sleeve (C5) extending between the metal tubes or cladding of the ends of the cables, comprising the steps of, accurately aligning said tubes in clamp units (10, 10') spaced from each other, one (10) of said clamp units fitting over the metal sleeve (C5) and the other of said clamp units (10') fitting over the cladding or metal tube, wherein each of said clamp units has a rotatably driveable rotation body (22) formed with an axial inserting hole (31, 35), and clamp means (28, 33, 34) coaxial with said inserting hole, located within said rotation body, said rotation body further being formed with at least one radially extending, selectively closable or blockable extraction path (36, 22'), characterized by the steps of:

locating said cable ends within said two clamp units;

clamping said cable ends coaxially with the axes of rotation of the respective rotation bodies within said clamp units and blocking said extraction paths;

rotating said rotation bodies, and said cables therein, and, during said rotation, metal-welding an end portion of the metal sleeve to the metal tube or cladding of at least one of said cables;

unblocking and opening said extraction path and releasing the cables from clamped condition within the respective clamp unit; and radially removing the cable, with the sleeve welded to at least one of the metal tubes or cladding from the rotation bodies through the respective extraction path of said clamp units.

11. The method of claim 10 characterized by the step of circumferentially and axially guiding the rotation body during said rotating step for accurately relatively positioning a laser welding head (T) carrying out the welding operation with respect to the metal sleeve, and the respective metal tube or cladding.

12. The method of claim 10 characterized in that the step of unblocking the radially extending extraction path comprises removing a portion of the rotation body, said portion extending from the insertion hole to the periphery thereof.

13. The method of claim 10 characterized in that said step of clamping the cable and the sleeve in the respective clamp unit comprises axially moving a split cone compression element with a conical opening (34) of a rotatable body element (33), to compress the cable, or sleeve, respectively, held in the insertion hole within the split cone element; and, wherein said clamp-releasing step comprises axially moving said split cone element automatically of said conical opening (34) and thereby permitting said cone halves to separate.

14. The method of claim 10 characterized in that said step of clamping the cable and the sleeve in the respective clamp unit comprises:

contracting the inserting hole to decrease a diameter of holding member (33) by turning an inner rotation body element (28) with respect to the rotation body (22) in a threaded hole (22D) of the rotation body (22) in one direction so as to clamp the optical fiber cable and the metal sleeve, respectively, prior to said rotating step, and expanding the inserting hole to increase the diameter of the holding members by threadedly turning the rotation body element (28) with respect to the rotation body in an opposite direction prior to said removal step so as to release the optical fiber cable and the metal sleeve from being clamped.

15. A method of joining or splicing two optical cables (C, C') having cable ends, in which said cables have metal tubes or cladding (C2, C2'), the optical fibers of said cable ends being fused and preliminarily connected with a metal sleeve (C5) extending between the metal tubes or cladding of the ends of the cables, the method comprising the steps of:

accurately aligning said tubes in clamp units (10, 10') spaced from each other, one (10) of said clamp units fitting over the metal sleeve (C5) and the other of said clamp units (10') fitting over the cladding or metal tube;

wherein each of said clamp units has a rotatably driveable rotation body (22) defining an axis of rotation and formed with an axial insertion hole (31, 35), lateral plane side surfaces, and clamp means (28, 33, 44) coaxial with said insertion hole, located within said rotation body;

locating said cable ends within said two clamp units;

clamping said cable ends coaxially with the axes of rotation of the respective rotation bodies within said clamp units and blocking said extraction path;

guiding said rotation body at said side surfaces to maintain accurate, wobble-free rotation of the rotation body about said axis; and rotating said rotation bodies, and said cables therein, and during said rotation, directing a laser means against at least one end portion of the metal sleeve to the metal tube or cladding of at least one said cables.

16. The method of claim 15, wherein said guiding step comprises engaging roller means (26, 27) against said side surfaces at a position remote from said axis.

* * * * *